United States Patent
Hoover

(10) Patent No.: US 6,860,059 B1
(45) Date of Patent: *Mar. 1, 2005

(54) SPINNER BAIT TACKLE ORGANIZER WITH COMPRESSION CATCHES

(75) Inventor: Ronald D. Hoover, Baton Rouge, LA (US)

(73) Assignee: Paragon Plastics, Inc., Union, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/862,939

(22) Filed: May 22, 2001

(51) Int. Cl.[7] .............................................. A01K 97/04
(52) U.S. Cl. ....................................................... 43/54.1
(58) Field of Search ................................ 43/54.1, 57.1, 43/57.2, 4.5; 206/315.11

(56) References Cited

U.S. PATENT DOCUMENTS

| | | | |
|---|---|---|---|
| 228,511 A | 6/1880 | Bray | |
| 1,790,498 A | 1/1931 | Dewey | |
| 1,858,539 A | 5/1932 | Dewey | |
| 2,220,817 A | * 11/1940 | Holmes | ...................... 36/67 A |
| 2,991,581 A | 7/1961 | Fracassi | |
| 3,133,374 A | 5/1964 | Benson | |
| 3,182,872 A | * 5/1965 | Brosseau | ................ 206/315.11 |
| 4,238,901 A | * 12/1980 | Martinet et al. | .............. 43/57.1 |
| 4,245,422 A | 1/1981 | Souza | |
| 4,375,137 A | 3/1983 | Chitwood | |
| 4,958,730 A | * 9/1990 | Bunten | ................... 206/315.11 |
| 5,079,863 A | * 1/1992 | Gillespie | ................ 206/315.11 |
| 5,228,232 A | * 7/1993 | Miles | .......................... 43/57.1 |
| 5,606,820 A | * 3/1997 | Suddeth | ................. 206/315.11 |
| 5,960,582 A | 10/1999 | Wilkins | |
| 6,101,760 A | * 8/2000 | Garman | ....................... 43/57.1 |
| 6,256,925 B1 | * 7/2001 | Blackburn | ................... 43/57.1 |

* cited by examiner

Primary Examiner—Peter M. Poon
Assistant Examiner—Bethany L. Griles
(74) Attorney, Agent, or Firm—Summa & Allan, P.A.

(57) ABSTRACT

A container for the convenient transport and storage of fishing lures, particularly spinner baits, is disclosed. The container includes channels running parallel to one another, a slightly raised portion for supporting the neck of a lure, and a vertically extending retaining piece. The retaining piece has at least one notch near its top for holding the compressed wire portion of a lure. Properly positioned within the container, a lure requires relatively little space and is secured to prevent tangling with other baits.

20 Claims, 4 Drawing Sheets

SPINNER BAIT TACKLE ORGANIZER WITH COMPRESSION CATCHES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

This invention relates, generally, to containers for the storage of fishing tackle.

2. Description of Related Art

Many products have been developed to store and transport fishing tackle of all kinds. These products have attempted to provide the convenience and versatility needed to satisfy fishermen using a variety of different baits. The hooks and thin wires that make up common fishing lures, such as spinner baits and buzz baits, tend to cause the lures to become tangled with each other when placed in proximity to one another.

Also, because these baits are made in irregular shapes and are produced in many different sizes, it is difficult to design a container versatile enough to accommodate the needs of the average fisherman.

U.S. Pat. No. 4,245,422 discloses a structure for the storage of spinner baits. A typical spinner bait is comprised of a V-shaped wire portion, with an elbow at the vertex that allows for compression of the wires without causing plastic deformation. The '422 patent includes a flat surface to which is attached three pegs in an isosceles triangle formation. According to the '422 patent, the elbow of the bait is placed over the odd peg and the wires of the bait are placed on the inside of the other pegs.

A severe limitation of the design in the '422 patent is that a very small range of sizes of spinner baits can be accommodated. The distance separating the three pegs is fixed, so that if the wire segments are too short, they will not reach from the odd peg to lob the other two. Also, this design requires a significant amount of space per bait because the baits are stored in a single plane. Another shortfall of the '422 patent is that it requires three points of attachment for a spinner bait, adding to the complexity and manufacturing cost of the device.

Based on the foregoing, there is a need in the art for a tackle container that can store numerous lures, regardless of their size, efficiently and conveniently.

SUMMARY OF THE INVENTION

It is an object of the present invention to provide a tackle container capable of conveniently carrying numerous spinner baits and buzz baits.

It is another object of the present invention to provide a tackle container that keeps the baits separated from one another, without making it difficult to insert or remove them from the container.

It is another object of the present invention to provide a tackle container that can store the baits efficiently, in a relatively small area.

These, and other objects of this invention will appear to one skilled in the art as the description thereof proceeds.

A tackle container made according to the present invention employs one of a variety of clips to grasp the wire portion of a fishing lure. The first embodiment, designed for spinner baits, is comprised of numerous parallel channels, each formed by a pair of barriers attached at the bottom of the container. The barriers do not have to be long or extend particularly high off the bottom of the container, provided they can engage a bait to prevent significant side-to-side movement.

Above each of the channels is a catch, preferably attached to one of the barriers for reinforcement. In the preferred design, the catch is merely a notch cut into a rigid member, suitable for accepting the wire portion of the bait and preventing its upward motion. The baits are placed within the channel and the wire portion is compressed and placed into the notch. In this way the volume occupied by the baits is reduced, and the baits are secured in position.

Another embodiment is a clip for a single bait, including a neck rest, a catch for grasping a compressed wire portion, and a strip of material connecting the two.

Another embodiment of the clip system uses a pair of clips, open in the longitudinal direction, separated by about half the length of a typical bait, and placed in a line so that a straight wire can pass through both. Most useful with buzz baits, once the bait's primary wire is inserted into the clips, the bait is free to rotate about the secured wire, but is held in place.

DETAILED DESCRIPTION OF THE INVENTION

Figure 1:
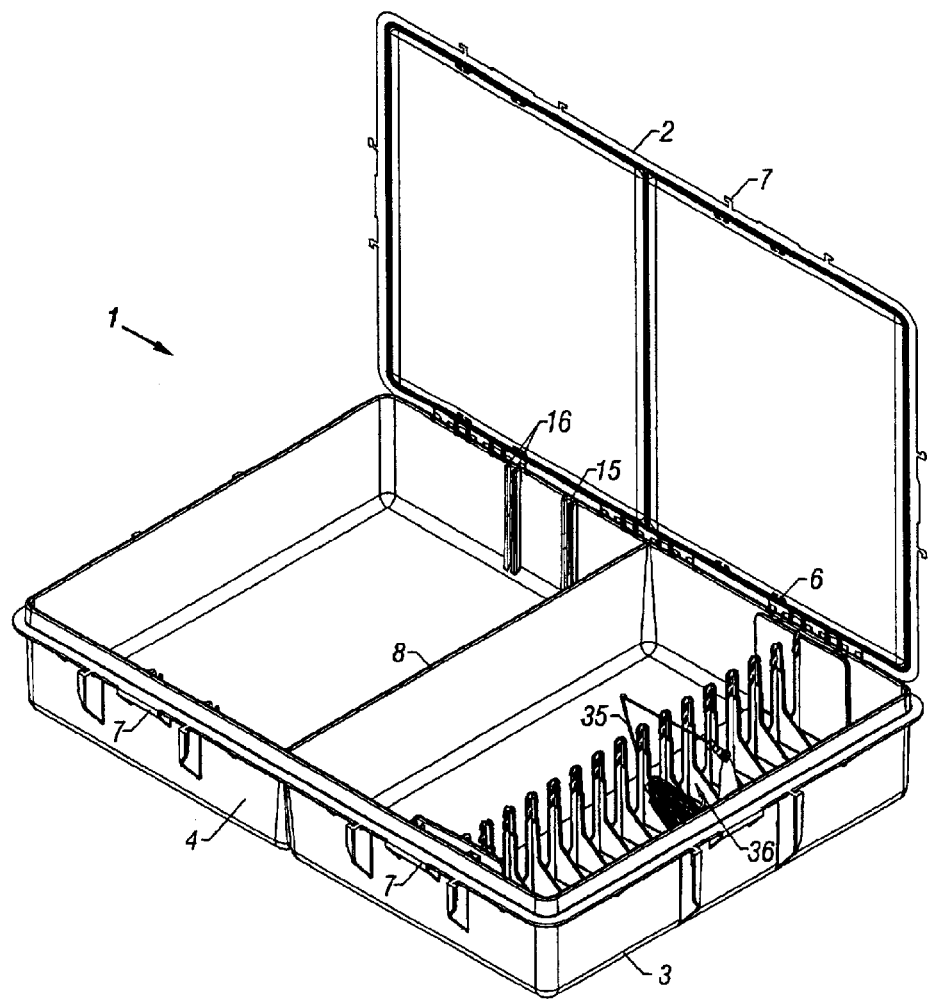
FIG. 1 is an isometric view of the invention fully assembled.

FIG. 1 shows the preferred embodiment of the invention as it appears when fully assembled Tackle container 1 is shown, with top 2, bottom 3, sidewall 4, and partition 8. Fishing lure 35 is also shown, secured into position with lower wire segment 41 against bottom 3 and upper wire segment 40 compressed and secured within catch 26. Fishing lure 35 also has head 38, hook 37, neck 39, and blade 36. Catch 26 is formed as a notch within retainer 25, which elevates catch 26 above bottom 3.

Figure 2:
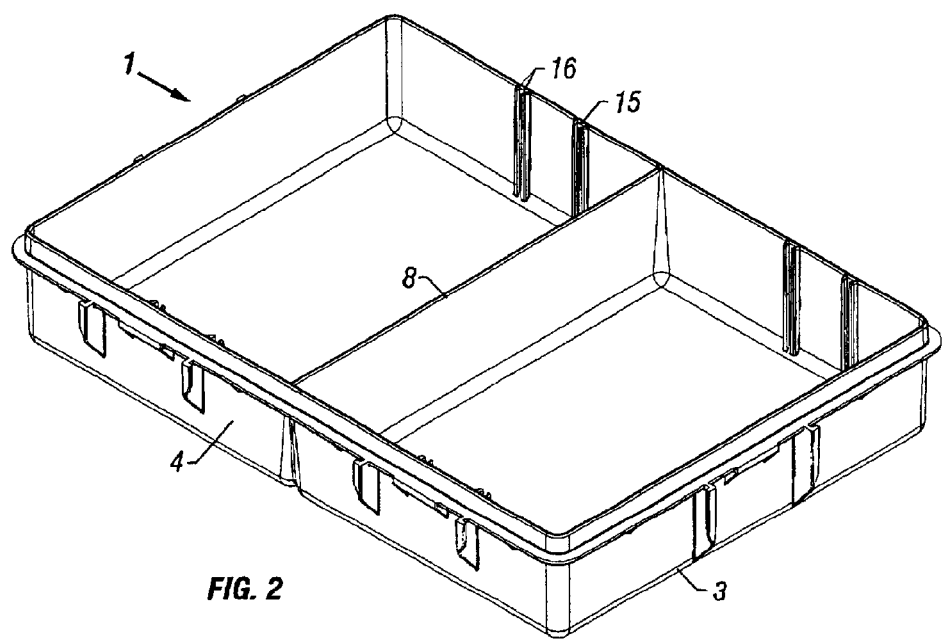
FIG. 2 is an isometric view of the invention without the inserts.

FIG. 2 shows tackle container 1 as it appears without insert 29. Slots 15 are shown, oriented vertically on the interior of sidewall 4. Each slot 15 is made from two webs 16. Webs 16 preferably converge slightly from top to bottom, to make it easier to insert rails 17 into slots 15 and to provide a snug fit once rails 17 are inserted their fill length. Rails 17 have a trapezoidal cross section, widening as they protrude from end wall 30. Slots 15 have a corresponding shape. This prevents rails 17 from disengaging from slots 17 in any way other than by lifting straight up. Partition 8 divides tackle container 1 approximately in half to make the storage of multiple types of baits more convenient.

Figure 3:
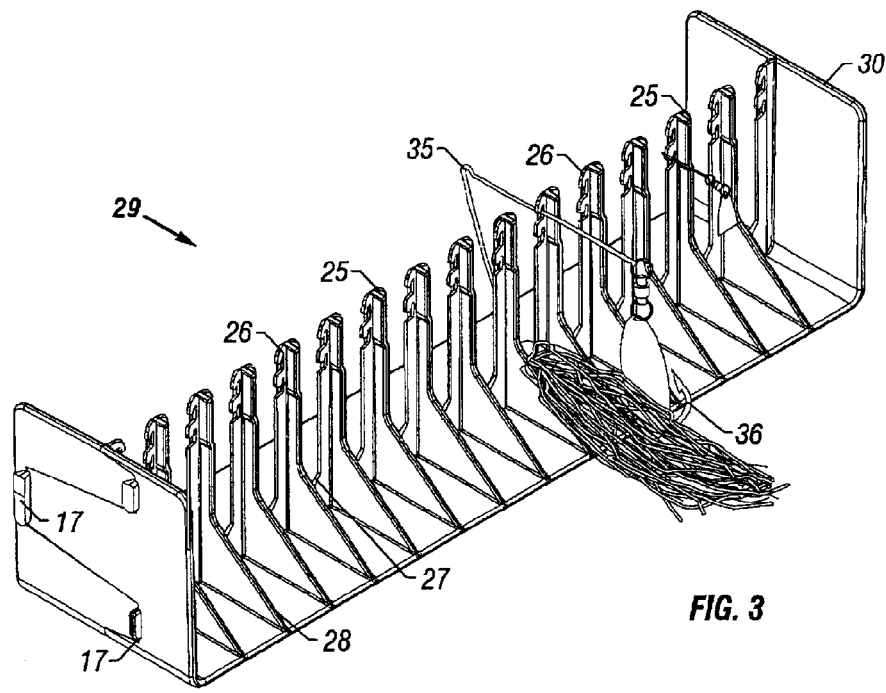
FIG. 3 is an isometric view of an insert.

FIG. 3 is a view of insert 29 in isolation. End walls 30, which are perpendicular to bottom 3 upon installation, provide a strong surface to which rails 17 are attached. Floor 31, which is approximately rectangular, extends between its short sides at end walls 30 to provide support for retainer 25.

Retainer 25, which comprises barrier 32, extends vertically from bottom 3, and the space between retainers 25 form channel 33. Barriers 32 prevent significant movement of lure 35 in a direction perpendicular to channel 33. In addition to retainer 25, barrier 32 also includes other structures that further define the boundaries of channels 33. For instance, in the preferred embodiment, gusset 28 is included to extend barrier 32 in a direction parallel to both channel 33 and a properly inserted lure 35. By lengthening barrier 32, gusset 28 further immobilizes lure 35. Gusset 28 also adds structural integrity by acting to prevent rotation of retainers 25 about the length of insert 29. When lure 35 is in proper position and compressed, with upper wire segment 40 locked into catch 26, lure 35 is held relatively motionless.

Figure 4:
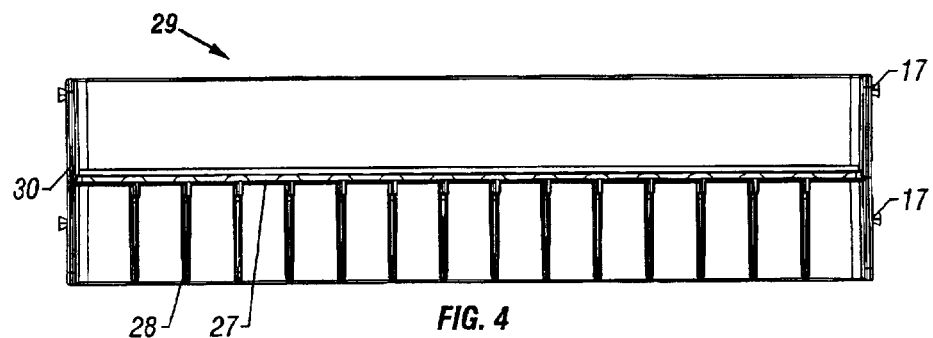
FIG. 4 is a top view of an insert.

Catches 26 are shown in FIG. 3 as well as FIG. 4. Catches 26 are preferably formed by notches in retainer 25. The notches should extend from the edge of retainer 25 in a slightly upward direction. This upward slant will prevent upper wire segment 40 from slipping out of catch 26 when fishing lure 35 is in place and under compression. In a preferred embodiment, additional notches are included, spaced vertically from catch 26. This allows many different sizes of fishing lure 35 to be stored without modification of tackle container 1.

Figure 5:
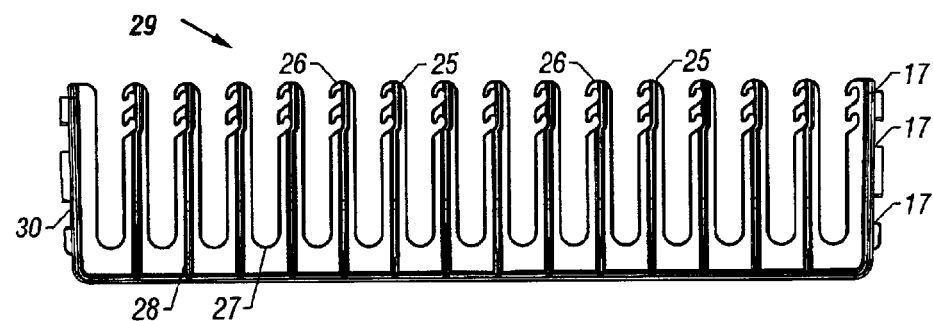
FIG. 5 is a side view of an insert.

Well depicted in FIGS. 3 and 5 are neck rests 27, part of the preferred embodiment of the invention. As shown, neck rests 27 are formed of a single piece of plastic running the width of tackle container 1. The bottom of neck rest 27 is flush with bottom 3, and the top is formed into a curved U-shape. In combination, neck rests 27 provide support for retainers 25, acting to prevent rotation about an axis perpendicular to insert 29. Neck rest 27 does not have to be the thin strip of material depicted. A more three-dimensional neck rest 27, contoured to shape of neck 39, may be employed.

Because most spinner baits are manufactured with approximately the same size neck 39, neck rest 27 can accommodate any size spinner bait without modification. When placing a fishing lure 35 in tackle container 1, neck 39 is placed directly over and in contact with neck rest 27. This will make it impossible for fishing lure 35 to slide longitudinally once a vertical force is applied to neck 39. The vertical force is generated when upper wire segment is compressed and placed within catch 26. Without neck rest 27, fishing lure 35 is not likely to slide due to the frictional forces induced by the compression, but the extra support is desirable.

Although the preferred embodiment has retainers 25 as part of insert 29, this is merely to facilitate the construction of the containers by injection molding and to make the containers more versatile. Slots 15 on the interior wall are suitable for inserts of many types, making tackle container 1 capable of storing a wide variety of baits. It is within the scope of the invention to make retainers 25 an integral, permanent part of tackle container 1.

Figure 6:
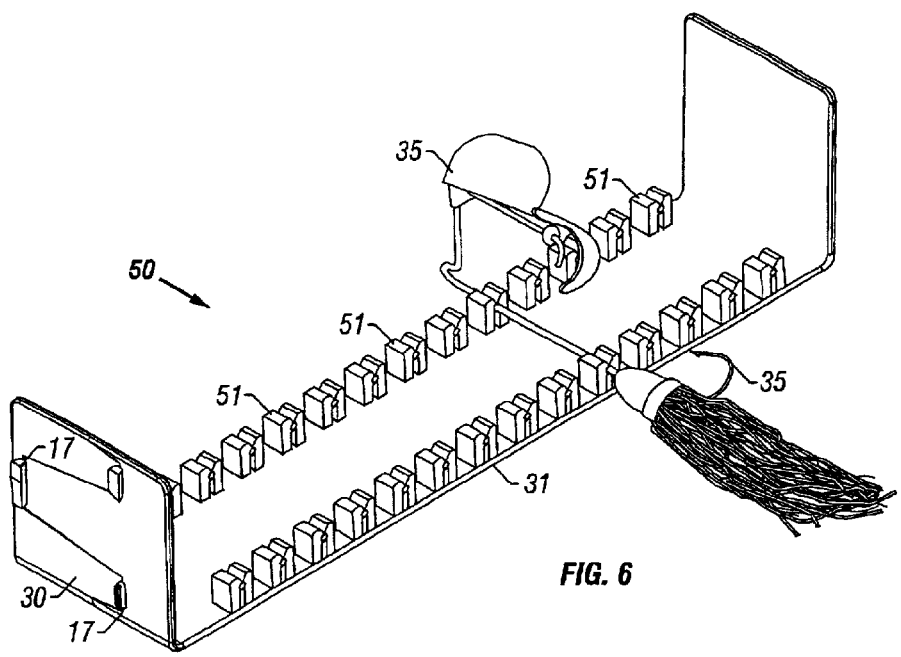
FIG. 6 is an isometric view of a buzz bait insert.

Pursuant to the idea of interchangeability, another embodiment of the invention is an alternative structure for insert 29. Shown in FIG. 6, buzz bait insert 50 is very similar to insert 29. It has end walls 30, rails 17, and floor 31. Instead of retainers 25, however, it has two or more rows of buzz clips 51. Buzz clips 51 are open in the longitudinal direction. Upon the application of pressure at the crack of buzz clip 51 by a wire, buzz clip 51 will open and allow the wire to enter. Thereafter it will close to prevent the wire from exiting without the application of another significant force to reopen buzz clip 51. Although buzz clips 51 are shown with their crack facing upward, any orientation would work reasonably well.

The two rows of buzz clips 51 are spaced so that the desired length buzz bait 50 will extend beyond each if buzz bait wire 52 is placed within two corresponding buzz clips. Once in place, very little pressure is applied to buzz bait wire 52 by buzz clips 51. The light pressure allows buzz bait wire 52 to rotate, the entire body of buzz bait 53 leaning to its side in the process. This diagonal orientation reduces the vertical storage space needed.

Figure 7:
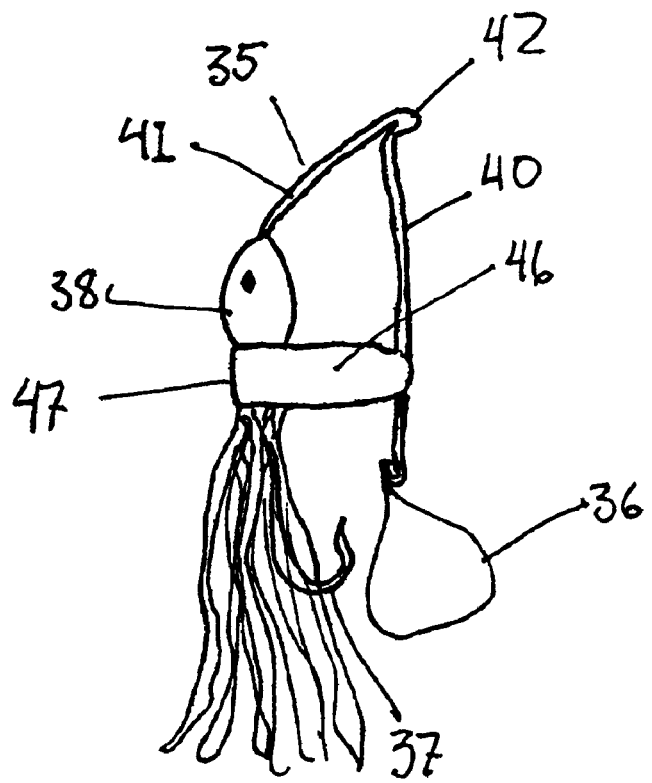
FIG. 7 is a side view of an individual lure clip.

FIG. 7 shows another embodiment of the invention, where bait clip 47 is used to maintain compression of a single fishing lure 35. Numerous fishing lures 35, when properly inserted into bait clip 47, can be placed into tackle container 1 if inserts 29 have been removed. To insert fishing lure 35 into bait clip 47, neck 39 is first placed onto neck rest 27 which is connected to one the ends of strip 46. With this support, upper wire segment 40 is then compressed and placed within catch 26, which is connected to the opposite end of strip 46. Bait clip 47 constrains fishing lures 35 to a smaller size so that more fishing lures 35 can fit into tackle container 1. Further, if many fishing lures 35 are stored in tackle container 1, the tangling of fishing lures 35 is minimized, and tangles that do occur are easier to separate.

There are of course other alternate embodiments that are obvious from the foregoing descriptions of the invention, which are intended to be included within the scope of the invention, as defined by the following claims.

I claim:

1. A container for holding fishing lures, each lure having a neck, a lower segment, and an upper segment, comprising:
   a bottom;
   a continuous sidewall coextensive with the perimeter of said bottom;
   a retainer comprising at least two substantially vertical posts connected to said bottom, said retainer further comprising at least two barriers, each said barrier extending substantially perpendicularly from a respective substantially vertical post said barriers being connected to said bottom to define therebetween a channel for holding a lower segment of a lure along said bottom; and
   a first catch in at least one of said substantially vertical posts for compressing an upper segment of a lure toward the lower segment of a lure.

2. The container of claim 1, further comprising a partition perpendicular to said bottom, dividing said container into two portions.

3. The container of claim 2, wherein said barriers extend substantially perpendicularly to said partition and form a row of channels within said sidewall on at least one side of said partition.

4. The container of claim 1, wherein said retainer further comprises at least one neck rest connected substantially perpendicularly to said bottom and further connected to two adjacent substantially vertical posts.

5. The container of claim 1, wherein said catch is from about 0.75 to 2 inches above said bottom.

6. A container for holding fishing lures that have a neck, a lower lure segment, and an upper lure segment, comprising:
   a bottom;
   a continuous sidewall coextensive with the perimeter of said bottom;

an insert that removably fits within said continuous sidewall, said insert comprising a floor and a retainer comprising two substantially vertical posts connected to said floor, said retainer further comprising at least two barriers, each said barrier extending substantially perpendicularly from a respective substantially vertical post, said barriers being connected to said floor to define therebetween a channel for holding a lower segment of a lure along said floor; and at least one catch in at least one of said substantially vertical posts for compressing an upper lure segment toward a lower lure segment.

7. The container of claim 6, further comprising:

a first pair of webs defining a first slot on said sidewall;

a first end wall connected to a first end of said insert, perpendicular to said floor and parallel to said barriers; and a first rail on the outside of said first end wall, said first rail adapted to slide into the slot defined by said webs.

8. The container of claim 7, further comprising:

a second pair of webs defining a second slot on said sidewall, parallel to and directly opposite the first slot on said sidewall;

a second end wall connected to a second end of said insert, opposite said first end wall, perpendicular to said floor, and parallel to said barriers;

a second rail on the outside of said second end wall, adapted to slide between said second pair of webs into the second slot as said first rail slides between said first pair of webs into the first slot.

9. The container of claim 1, further comprising a second catch in at least one substantially vertical post, said second catch vertically separated from said first catch.

10. The container of claim 1, wherein each of said barriers comprises a gusset connected substantially perpendicularly to a respective substantially vertical post.

11. The container of claim 6, wherein said retainer further comprises at least one neck rest connected substantially perpendicularly to said bottom and further connected to two adjacent substantially vertical post.

12. The container of claim 6, wherein each of said barriers comprises a gusset connected substantially perpendicularly to a respective vertical post.

13. The container of claim 6, further comprising a partition perpendicular to said bottom, dividing said container into two roughly equal portions.

14. The container of claim 13, wherein said barriers extend substantially perpendicularly to said partition and form a row of channels within said sidewall on at least one side of said partition.

15. The container of claim 1, wherein at least one of said substantially vertical posts further comprises a second catch vertically separated from said first catch.

16. The container of claim 1, wherein said continuous sidewall and a respective barrier on each end of said retainer define respective channels.

17. The container of claim 7, wherein said end wall of said insert and a respective barrier on each end of said insert define respective channels.

18. The container of claim 11, wherein said at least one neck rest is U-shaped.

19. A container for holding spinner bait fishing lures, comprising:

a bottom;

a continuous sidewall coextensive with the perimeter of said bottom;

an insert that removably fits within said continuous sidewall, said insert comprising a floor and a retainer comprising at least two substantially vertical posts connected to said floor, said retainer further comprising at least two barriers, each said barrier extending substantially perpendicularly from a respective substantially vertical post, wherein each said barrier further comprises a gusset connected to said floor to define therebetween a channel for holding a lower segment of a lure along said floor; and at least one catch in at least one of said substantially vertical posts for compressing an upper lure segment toward a lower lure segment.

20. The container of claim 19, wherein said catch defines a notch that is upwardly recessed from the edge of said retainer.

* * * * *